United States Patent
Park et al.

(10) Patent No.: US 9,031,149 B2
(45) Date of Patent: May 12, 2015

(54) PRECODING METHOD AND APPARATUS

(71) Applicant: Electronics and Telecommunications Research Institute, Daejeon (KR)

(72) Inventors: In Sook Park, Daejeon (KR); Kwang Jae Lim, Daejeon (KR); DongSeung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/104,540

(22) Filed: Dec. 12, 2013

(65) Prior Publication Data

US 2014/0241448 A1    Aug. 28, 2014

(30) Foreign Application Priority Data

Feb. 28, 2013  (KR) .................. 10-2013-0022260

(51) Int. Cl.
| | | |
|---|---|---|
| H04L 1/02 | (2006.01) | |
| H04L 27/28 | (2006.01) | |
| H04B 7/04 | (2006.01) | |
| H04L 25/03 | (2006.01) | |
| H04B 7/06 | (2006.01) | |

(52) U.S. Cl.
CPC ............ *H04B 7/0456* (2013.01); *H04B 7/0417* (2013.01); *H04B 7/0626* (2013.01); *H04L 25/0391* (2013.01)

(58) Field of Classification Search
CPC .... H04L 1/0618; H04L 1/06; H04L 25/03949
USPC .................. 375/267, 260, 285, 296; 370/252
See application file for complete search history.

(56) References Cited

U.S. PATENT DOCUMENTS

| | | | |
|---|---|---|---|
| 2009/0046800 A1 | 2/2009 | Xu et al. | |
| 2010/0203912 A1* | 8/2010 | Ashikhmin et al. | .......... 455/501 |
| 2011/0026427 A1* | 2/2011 | Wang et al. | ................... 370/252 |
| 2011/0045782 A1 | 2/2011 | Shin et al. | |
| 2012/0014468 A1 | 1/2012 | Wu et al. | |
| 2013/0101008 A1* | 4/2013 | Tseng et al. | .................. 375/227 |

FOREIGN PATENT DOCUMENTS

| | | |
|---|---|---|
| KR | 10-2011-0018556 A | 2/2011 |
| KR | 10-2011-0035555 A | 4/2011 |
| KR | 10-2011-0049141 A | 5/2011 |

OTHER PUBLICATIONS

Krishna Gomadam et al., "Approaching the Capacity of Wireless Networks through Distributed Interference Alignment" IEEE GLOBECOM, pp. 1-6, 2008.
Steven W. Peters et al., "Cooperative Algorithms for MIMO Interference Channels" IEEE Trans. Vehicular Technology 60/1, pp. 206-218, 2010.
Steven W. Peters et al., "Interference Alignment via Alternating Minimization" IEEE ICASSP, pp. 2445-2448, 2009.

* cited by examiner

*Primary Examiner* — Khai Tran
(74) *Attorney, Agent, or Firm* — Rabin & Berdo, P.C.

(57) ABSTRACT

A transmit node receives a transformed correlation matrix or a correlation matrix of a channel coefficient matrix, or a correlation matrix of an interference channel coefficient matrix from each of receive nodes sharing a radio resource. The transmit node determines a precoder based on a value maximizing values determined by the transformed correlation matrix or the correlation matrix of the channel coefficient matrix, or a value minimizing values determined by the correlation matrix of the interference channel coefficient matrix, and precodes a transmit signal by using the determined precoder.

20 Claims, 7 Drawing Sheets

PRECODING METHOD AND APPARATUS

CROSS-REFERENCE TO RELATED APPLICATION

This application claims priority to and the benefit of Korean Patent Application No. 10-2013-0022260 filed in the Korean Intellectual Property Office on Feb. 28, 2013, the entire contents of which are incorporated herein by reference.

BACKGROUND OF THE INVENTION (a) Field of the Invention

The present invention generally relates to a precoding method and apparatus.

(b) Description of the Related Art

When a plurality of transmit nodes communicate using the same resources, each transmit node precodes a transmit signal to reduce the influence of an interference signal. The precoding means applying a precoder to the transmit signal. The precoder may be called as a precoding matrix, a precoding vector, a beamforming matrix, or a beamforming vector.

Algorithms in which each transmit node calculates the precoder by using only partial information of entire channel information of a network using the same resources, calculates a corresponding receive filter, and updates the precoder in accordance with the receive filter have been developed. The transmit node preforms repetitive calculations to determine the precoder.

According to these algorithms, all transmit nodes receive channel information required for calculating the precoder from the receive nodes. Since instantaneous channel information is required for the repetitive calculations, a feedback cycle is reduced such that the amount of the feedback increases if a time-variant rate increases according to movement of the node or change of the communication environment. Further, additional calculation increases such that a substantive increase of information data rate is reduced.

SUMMARY OF THE INVENTION

An aspect of the present invention provides a precoding method and apparatus for decreasing required feedback information and increasing a data rate when a plurality of users transmit signals using the same resources.

According to another aspect of the present invention, a method of precoding a signal is provided by a transmit node. The method includes receiving channel information from each of a plurality of receive nodes sharing a radio resource wherein the channel information is determined by at least a channel coefficient matrix, determining a precoder based on values determined by a channel information set formed by the channel information, and precoding a transmit signal by using the precoder.

The channel information may include a correlation matrix averaging a product of a conjugate transpose of the channel coefficient matrix and the channel coefficient matrix within a predetermined time domain and a predetermined frequency domain.

The channel information may be determined by the channel coefficient matrix and a noise signal.

The channel information may include a transformed correlation matrix averaging a product of a conjugate transpose of the channel coefficient matrix, an inverse matrix of a covariance matrix of the noise signal, and the channel coefficient matrix within a predetermined time domain and a predetermined frequency domain.

Receiving the channel information may include receiving a bit stream that is calculated by quantizing the channel information.

Determining the precoder may include extracting, in order of magnitude, a predetermined number of eigenvalues from among eigenvalues of the channel information set, calculating eigenvectors corresponding to the extracted eigenvalues, and arranging the eigenvectors in a matrix to generate the precoder. In this case, the predetermined number may be equal to or less than half of a rank of the channel information set.

Determining the precoder may include calculating a set of a matrix product of the channel information set and each code of a codebook of the transmit node, selecting a predetermined number of codes for maximizing a magnitude of the matrix product from among the set of the matrix product, and generating the precoder by using the selected codes. In this case, a product of a rank of the code of the codebook and the predetermined number may be equal to or less than half of a rank of the channel information set.

According to yet another aspect of the present invention, a method of precoding a signal is provided by a transmit node. The method includes receiving interference channel information from each of a plurality of receive nodes sharing a radio resource wherein the interference channel information is determined by at least an interference channel coefficient matrix, determining a precoder based on values determined by an interference channel information set formed by the interference channel information, and precoding a transmit signal by using the precoder.

The interference channel information may include a correlation matrix averaging a product of a conjugate transpose of the interference channel coefficient matrix and the interference channel coefficient matrix within a predetermined time domain and a predetermined frequency domain.

Receiving the interference channel information may include receiving a bit stream that is calculated by quantizing the interference channel information.

Determining the precoder may include extracting, in reverse order of magnitude, a predetermined number of eigenvalues from among eigenvalues of an interference channel strength matrix calculated by adding the interference channel information, calculating eigenvectors corresponding to the extracted eigenvalues, and arranging the eigenvectors in a matrix to generate the precoder. In this case, the predetermined number may be equal to or less than half of a rank of the interference channel strength matrix.

Determining the precoder may include calculating an interference signal strength using the interference channel information and a codebook of the transmit node, selecting a precoder set for minimizing a sum of interference signal strengths for the plurality of receive nodes, and selecting the precoder corresponding to the transmit node from among the selected precoder set. In this case, the interference signal strength may be a trace of a matrix corresponding to a product of the interference channel information, a precoder included in the codebook, and a conjugate transpose of the precoder included in the codebook.

According to still another aspect of the present invention, a precoding apparatus including a feedback receiver, a precoder determiner, and a precoder is provided. The feedback receiver receives a transformed correlation matrix of a channel coefficient matrix, a correlation matrix of the channel coefficient matrix, or a correlation matrix of an interference channel coefficient matrix from each of a plurality of receive nodes sharing a radio resource. The precoder determiner determines a precoder based on a value maximizing values determined by a set of the transformed correlation matrix of the channel coefficient matrix or a set of the correlation matrix of the channel coefficient matrix, or a value minimizing values determined by a set of the correlation matrix of the interference channel coefficient matrix. The precoder precodes a transmit signal using the determined precoder.

The correlation matrix of the channel coefficient matrix may be a matrix averaging a product of a conjugate transpose of the channel coefficient matrix and the channel coefficient matrix within a predetermined time domain and a predetermined frequency domain.

The transformed correlation matrix of the channel coefficient matrix may be a matrix averaging a product of a conjugate transpose of the channel coefficient matrix, an inverse matrix of a covariance matrix of a noise signal, and the channel coefficient matrix within a predetermined time domain and a predetermined frequency domain.

The correlation matrix of the interference channel coefficient matrix may be a matrix averaging a product of a conjugate transpose of the interference channel coefficient matrix and the interference channel coefficient matrix within a predetermined time domain and a predetermined frequency domain.

DETAILED DESCRIPTION OF THE EMBODIMENTS

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term "terminal" may designate a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), and so on, or may include all or some functions thereof.

Further, the term "base station" (BS) may designate an advanced base station (ABS), a high reliability base station (HR-BS), a node B, an evolved node B (eNodeB), an access point (AP), a radio access station (RAS), a base transceiver station (BTS), an MMR (mobile multihop relay)-BS, a relay station (RS) performing base station function, a high reliability relay station (HR-RS) performing the base station function and so on, or may include all or some functions thereof.

Figure 1:
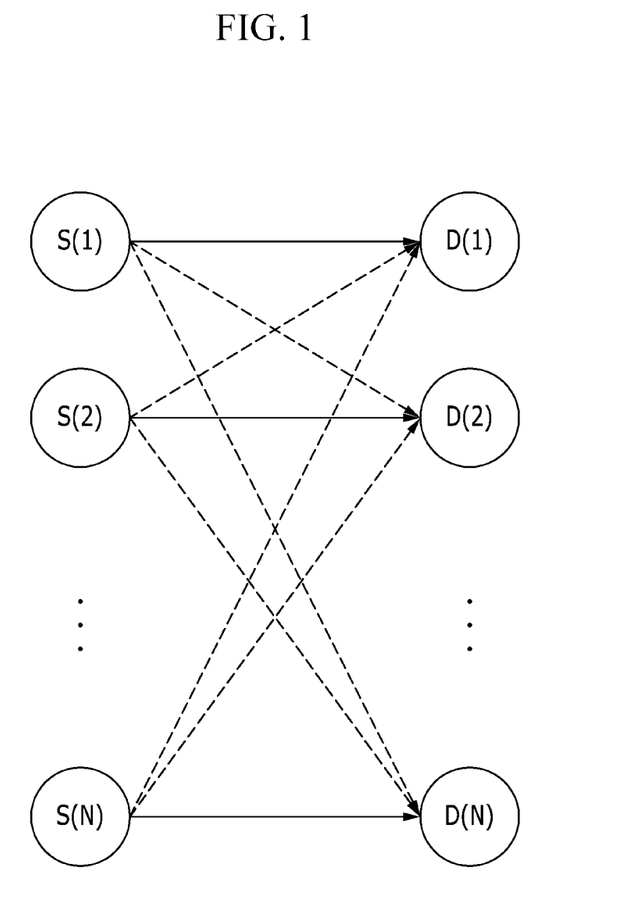
FIG. 1 shows a wireless communication system according to an embodiment of the present invention.

FIG. 1 shows a wireless communication system according to an embodiment of the present invention.

Referring to FIG. 1, a plurality of nodes transmit and receive signals using the same resources. A node for transmitting a signal is referred to as a transmit (Tx) node S(k), and a node for receiving a signal is referred to as a receive (Rx) node D(i). The Tx node or Rx node may be a base station or a terminal. The Tx node or Rx node is an entity having a device for transmitting or receiving a signal, and may have at least one antenna.

A channel coefficient matrix of a channel on a signal transmitted from the Tx node S(k) to the Rx node D(i) is denoted as $H_{ik}$, and a precoder which the Tx node S(k) applies to transmit the signal is denoted as $V_k$.

When the Rx node D(i) receives a signal from the Tx node S(k), the $H_{ik}$ is the channel coefficient matrix for a transmit signal. When the Rx node D(i) receives a signal from nodes other than the Tx node S(k), a signal transmitted by the Tx node S(k) is an interference signal, and the $H_{ik}$ is the channel coefficient matrix of the interference signal, i.e., an interference channel coefficient matrix.

According to an embodiment of the present invention, the Tx node precodes the transmit signal to allow a strength of the transmit signal to be increased.

Hereinafter, a precoding method according to an embodiment of the present invention is described with reference to FIG. 2 and FIG. 3.

Figure 2:
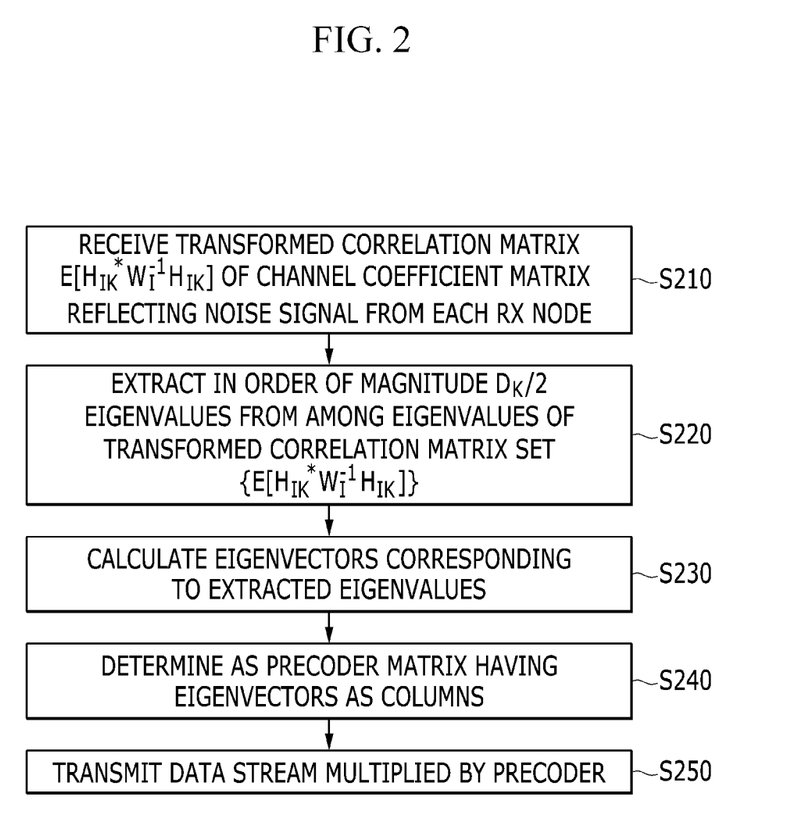
FIG. 2, FIG. 3, FIG. 4, FIG. 5, and FIG. 6 are flowcharts of a precoding method according to various embodiments of the present invention.
Figure 3:
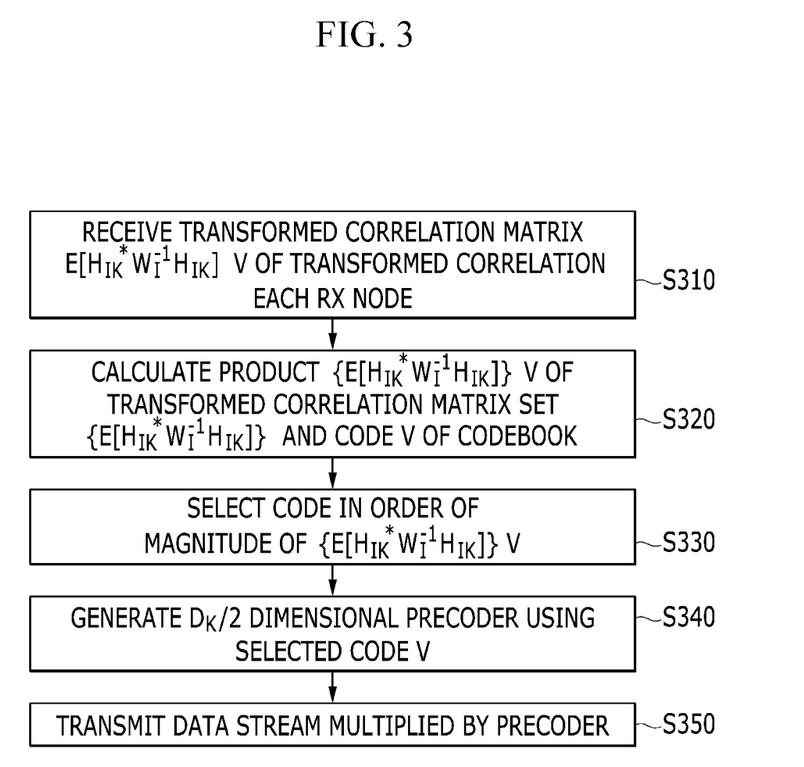

It is assumed in FIG. 2 and FIG. 3 that the number of Tx nodes and the number of Rx nodes using the same resources are N. Further, it is assumed that transmit signals transmitted by Tx nodes [S(k), k≠i] other than the i-th Tx node S(i) act as interference signals on the i-th Rx node D(i).

FIG. 2 is a flowchart of a precoding method according to an embodiment of the present invention.

An interference signal which the Rx node receives through an interference channel that cannot be measured by the Rx node in a wireless network environment, may be recognized as the colored noise not the white Gaussian noise. A covariance matrix $W_i$ of the interference signal may be calculated as a covariance matrix $E[v_i v_i^*]$ of a noise signal $v_i$ measured by the Rx node. The $v_i^*$ is a conjugate transpose of the $v_i$, and the $E[v_i v_i^*]$ is an average value averaging a product $v_i v_i^*$ of two matrices $v_i$ and $v_i^*$ within a predetermined resource area, i.e., a predetermined time domain and a predetermined frequency domain. The conjugate transpose of a matrix A is denoted as A*.

Referring to FIG. 2, each Rx node D(i) calculates a transformed correlation matrix $E[H_{ik}^* W_i^{-1} H_{ik}]$ of a channel coefficient matrix $H_{ik}$ to reflect the influence of a noise signal, and feedbacks the transformed correlation matrix to all Tx nodes using the same resources in broadcast (S210). When the different Tx nodes transmit signals to the different Rx nodes, respectively, it can be indexed that the i-th Tx node S(i) transmits a signal to the i-th Rx node D(i). In this case, since the channel coefficient matrix on the receive signal D(i) is $H_{ii}$, $E[H_{ik}^* W_i^{-1} H_{ik}]$ becomes $E[H_{ii}^* W_i^{-1} H_{ii}]$. Here, the transformed correlation matrix $E[H_{ik}^* W_i^{-1} H_{ik}]$ of the channel coefficient matrix reflecting the noise signal is an average value averaging a product $H_{ik}^* W_i^{-1} H_{ik}$ of three matrices $H_{ik}^* W_i^{-1}$, and $H_{ik}$ within a predetermined resource area, i.e., a predetermined time domain and a predetermined frequency domain. For example, the transformed correlation matrix $E[H_{ik}^* W_i^{-1} H_{ik}]$ may be calculated by averaging the matrix product $H_{ik}^* W_i^{-1} H_{ik}$ over blocks consisting of total usage frequency bandwidths and fifty symbols.

The Rx node D(i) may feedback a bit stream that is calculated by quantizing each element of $E[H_{ik}^* W_i^{-1} H_{ik}]$ for ease of feedback.

Each Tx node S(k) extracts, in order of magnitude, a predetermined number of eigenvalues from among eigenvalues of a set $\{E[H_{ik}^* W_i^{-1} H_{ik}]\}$ of the transformed correlation matrices received from the plurality of Rx nodes (S220). Here, the predetermined number may be equal to or less than $d_k/2$, and $d_k$ is a rank of the transformed correlation matrix set $\{E[H_{ik}*W_i^{-1}H_{ik}]\}$. In particular, each Tx node S(k) may extract, in order of magnitude, $d_k/2$ eigenvalues. Next, each Tx node S(k) calculates eigenvectors corresponding to the extracted eigenvalues (S230), and arranges the eigenvectors in a matrix to generate the precoder (S240). For example, each Tx node S(k) may determine, as a precoder $V_k$, a matrix having the eigenvectors as columns (S240). The Rx node may also perform the procedures S220 to S240 to identify the precoder $V_k$. When the Tx node has four antennas, the $d_k$ may be four, and the precoder $V_k$ may be 4×2 matrix.

Next, each Tx node S(k) transmits a data stream multiplied by the determined precoder $V_k$ to a desired Rx node (S250). The Rx node received a signal from the Tx node S(k) decodes the signal based on the measured channel information (i.e., the channel coefficient matrix) and the precoder $V_k$. When the Rx node does not perform the procedures S220 to S240, the Tx node S(k) may feedback information on the determined precoder $V_k$ to the Rx node.

FIG. 3 is a flowchart of a precoding method according to another embodiment of the present invention.

Referring to FIG. 3, each Rx node D(i) calculates a transformed correlation matrix $E[H_{ik}*W_i^{-1}H_{ik}]$ of a channel coefficient matrix $H_{ik}$ and feedbacks the transformed correlation matrix $E[H_{ik}*W_i^{-1}H_{ik}]$ to all Tx nodes in broadcast (S310). When the different Tx nodes transmits signals to the different Rx nodes, respectively, $E[H_{ik}*W_i^{-1}H_{ik}]$ becomes $E[H_{ii}*W_i^{-1}H_{ii}]$.

Each Tx node S(k) calculates a set $\{E[H_{ik}*W_i^{-1}H_{ik}]\}V$ of a product $E[H_{ik}*W_1^{-1}H_{ik}]V$ of the transformed correlation matrix and a code for each code V of a codebook by using a transformed correlation matrix set $\{E[H_{ik}*W_i^{-1}H_{ik}]\}$ that is received from the plurality of Rx nodes (S320). The Tx node S(k) extracts, in order of magnitude, at least one $E[H_{ik}*W_i^{-1}H_{ik}]V$ matrix from among $\{E[H_{ik}*W_i^{-1}H_{ik}]\}V$ set, and selects at least one code V corresponding to the extracted $E[H_{ik}*W_i^{-1}H_{ik}]V$ matrix (S330). The Tx node S(k) generates $d_k/2$-dimensional precoder $V_k$ based on the selected code V (S340). For example, when the code V of the codebook is one-dimensional vector, the Tx node S(k) may select $d_k/2$ codes V, and determines, as the precoder $V_k$, a matrix having the selected codes V as columns. Alternatively, when the code V of the codebook is $d_k/2$-dimensional vector, the Tx node S(k) may select one code V for maximizing the magnitude of the $E[H_{ik}*W_i^{-1}H_{ik}]V$ matrix, and may determine the selected code V as the precoder $V_k$. That is, a product of a rank of the code V of the codebook and the number of the selected codes is equal to or less than $d_k/2$. The Rx node may also perform the procedures S320 to S340 to identify the precoder $V_k$. When the Tx node has four antennas, the precoder $V_k$ may be 4×2 matrix.

Next, each Tx node S(k) transmits a data stream multiplied by the determined precoder $V_k$ to a desired Rx node (S350). The Rx node received the signal from the Tx node S(k) decodes the signal based on the measured channel information and the precoder $V_k$. When the Rx node does not perform the procedures S320 to S340, the Tx node S(k) may feedback information on the determined precoder $V_k$ to the Rx node.

Figure 4:
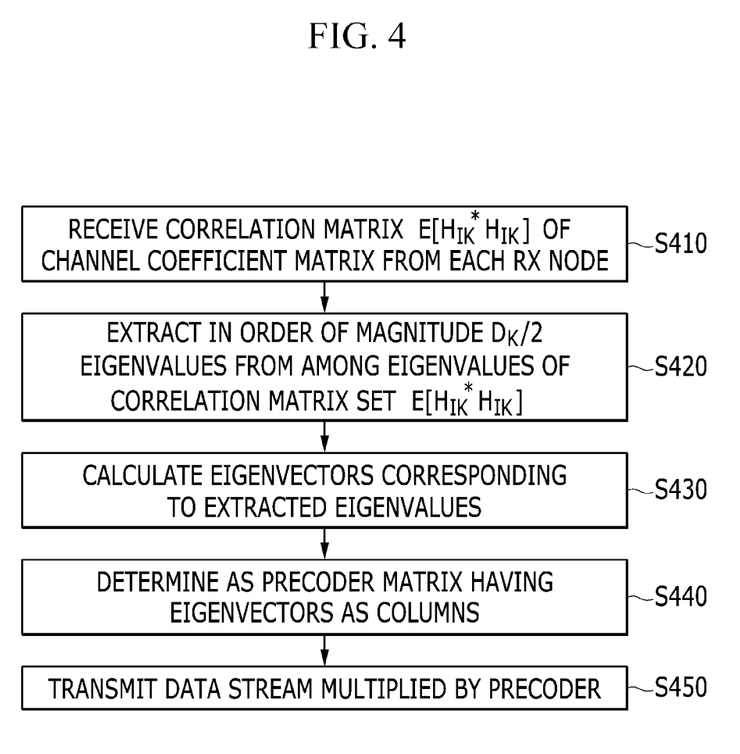

FIG. 4 is a flowchart of a precoding method according to yet another embodiment of the present invention.

Referring to FIG. 4, each Rx node D(i) calculates a correlation matrix $E[H_{ik}*H_{ik}]$ of a channel coefficient matrix $H_{ik}$ for a signal to be transmitted to itself, and feedbacks the correlation matrix $E[H_{ik}*H_{ik}]$ to all Tx nodes in broadcast (S410). The Rx node D(i) may feedback a bit stream that is calculated by quantizing each element of $E[H_{ik}*H_{ik}]$ for ease of feedback.

When the different Tx nodes transmit signals to the different Rx nodes, respectively, it can be indexed that the i-th Tx node S(i) transmits a signal to the i-th Rx node D(i). Accordingly, $E[H_{ik}*W_i^{-1}H_{ik}]$ becomes $E[H_{ii}*W_i^{-1}]$.

Each Tx node S(k) extracts, in order of magnitude, a predetermined number eigenvalues from among eigenvalues of a set $\{E[H_{ik}*H_{ik}]\}$ of the correlation matrices received from the Rx nodes (S420). Here, the predetermined number may be equal to or less than $d_k/2$, and $d_k$ is a rank of the transformed correlation matrix set $\{E[H_{ik}*H_{ik}]\}$. In particular, each Tx node S(k) may extract, in order of magnitude, $d_k/2$ eigenvalues. Next, each Tx node S(k) calculates eigenvectors corresponding to the extracted eigenvalues (S430), and determines, as a precoder $V_k$, a matrix having the eigenvectors as columns (S440). The Rx node may also perform the procedures S420 to S440 to identify the precoder $V_k$. When the Tx node has four antennas, the $d_k$ may be four and the precoder $V_k$ may be 4×2 matrix.

Next, each Tx node S(k) transmits a data stream multiplied by the determined precoder $V_k$ to a desired Rx node (S450). The Rx node received the signal from the Tx node S(k) decodes the signal based on the measured channel information and the precoder $V_k$. When the Rx node does not perform the procedures S420 to S440, the Tx node S(k) may feedback information on the determined precoder $V_k$ to the Rx node.

As described with reference to FIG. 3, the Tx node may determine a precoder $V_k$ by calculating a set $\{E[H_{ik}*H_{ik}]\}V$ of a product $E[H_{ik}*H_{ik}]V$ of the correlation matrix and a code for each code V of a codebook, and select at least one code V corresponding to $E[H_{ik}*H_{ik}]V$ matrix having the greatest magnitude.

According to embodiments described with reference to FIG. 2 to FIG. 4, a method for calculating a precoder $V_k$ for maximizing a value determined by a transformed correlation matrix $E[H_{ik}*W_i^{-1}H_{ik}]$ or a correlation matrix $E[H_{ik}*H_{ik}]$ of a channel coefficient matrix has been used to determine the precoder $V_k$ for increasing the strength of a signal to be transmitted to the Rx node D(i). Alternatively, a precoder $V_k$ for decreasing the strength of an interference signal may be determined. Hereinafter, this embodiment is described with reference to FIG. 5 or FIG. 6.

Figure 5:
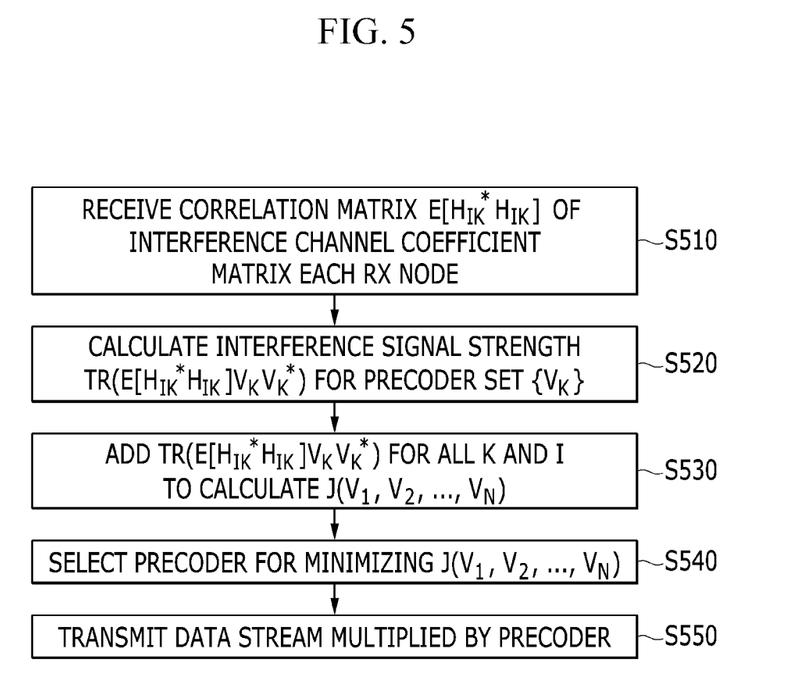
Figure 6:
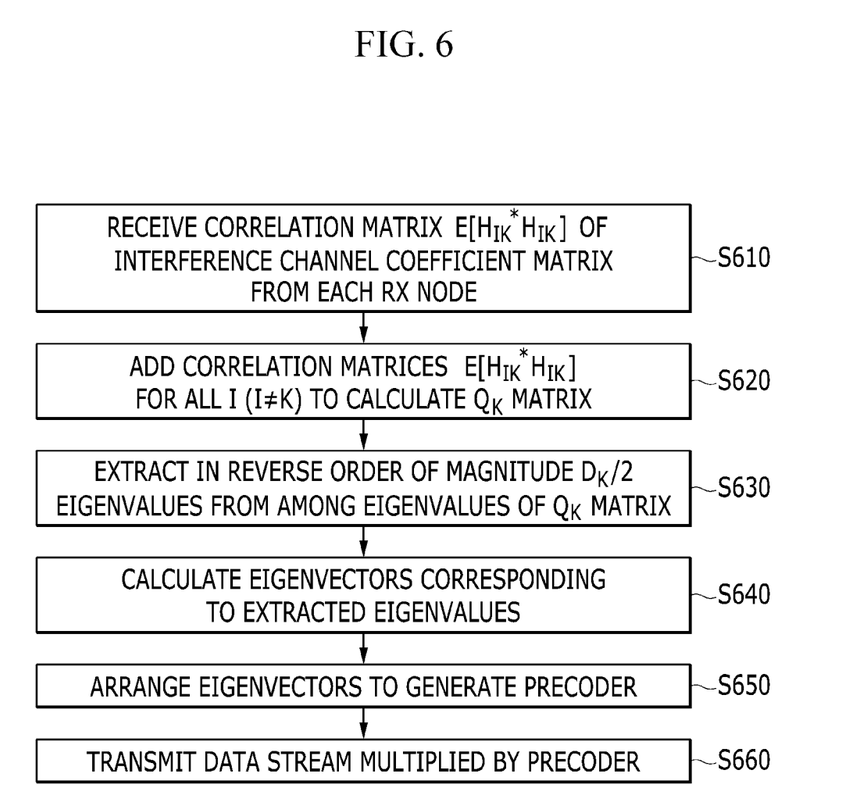

FIG. 5 and FIG. 6 each is a flowchart of a precoding method according to yet another embodiment of the present invention.

Referring to FIG. 5, each Rx node D(i) calculates correlation matrices $E[H_{ik}*H_{ik}]$) for a plurality of interference channel coefficient matrices ($H_{ik}$, k=1, 2, . . . , N, k≠i), and feedbacks the correlation matrices to all Tx nodes and Rx nodes using the same resources in broadcast (S510).

Next, each Tx node S(k) received from the correlation matrices $E[H_{ik}*H_{ik}]$ calculates $tr(E[H_{ik}*H_{ik}]V_kV_k*)$ for all interference channel coefficient matrices $H_{ik}$ and a set $\{V_k\}$ of a precoder $V_k$ (S520). The Tx nodes and Rx nodes share a precoder codebook. The precoder codebook of the k-th Tx node S(k) includes the precoder set $\{V_k\}$ ($\{V_k\}=V_{k1}, V_{k2}, . . . , V_{kn}$). When the Tx node has four antennas, the precoder $V_k$ may be 4×2 matrix.

The $tr(E[H_{ik}*H_{ik}]V_kV_k*)$ calculated by the Tx node represents the interference signal strength. Here, tr(A) indicates a trace of a matrix A, i.e., a sum of diagonal elements of the matrix A, The Tx node S(k) adds the traces $tr(E[H_{ik}*H_{ik}]V_kV_k*)$ for all k and i (k≠i) as expressed in Equation 1 (S530). The added result is called as $J(V_1, V_2, . . . , V_N)$. The Tx node S(k) calculates $J(V_1, V_2, . . . , V_N)$ for all available $\{V_1, V_2, . . . , V_N\}$.

$$J(V_1, V_2, \ldots, V_N) = \sum_{k,i=1, k \neq i}^{N} tr(E[H_{ik}^* H_{ik}] V_k V_k^*) \quad (1)$$

Next, the Tx node S(k) selects a code, i.e., a precoder ($V_1$, $V_2$, ..., $V_N$) for minimizing $J(V_1, V_2, \ldots, V_N)$ from among a plurality of $J(V_1, V_2, \ldots, V_N)$ corresponding all code combinations of $\{V_1, V_2, \ldots, V_N\}$ (S540).

Next, each Tx node S(k) transmits a data stream multiplied by a precoder Vk corresponding to its index among the selected precoder ($V_1$, $V_2$, ..., $V_N$) to a desired Rx node (S550).

The Rx node received the signal from the Tx node S(k) decodes the signal based on the measured channel information and the selected precoder ($V_1$, $V_2$, ..., $V_N$). In the step S540, the Tx node may transmit information of the selected precoder ($V_1$, $V_2$, ..., $V_N$), for example an index of a code corresponding to the selected precoder in the codebook, to the plurality of Rx nodes.

When the codebook is not used, the Tx node and Rx node may directly calculate a precoder for decreasing the strength of the interference signal as described with reference to FIG. 2 and FIG. 4.

In detail, referring to FIG. 6, each Rx node D(i) calculates correlation matrices $E[H_{ik}^* H_{ik}]$ for a plurality of interference channel coefficient matrices ($H_{ik}$, k=1, 2, ..., N, k≠i), and feedbacks the correlation matrices to all Tx nodes and Rx nodes using the same resources in broadcast (S610).

Next, each Tx node received the correlations matrices ($E[H_{ik}^* H_{ik}]$, i=1, 2, ..., N) calculates an interference channel strength matrix $Q_k$ as expressed in Equation 2 (S620).

$$Q_k = \sum_{i=1, i \neq k}^{N} E[H_{ik}^* H_{ik}] \quad (2)$$

The Tx node S(k) extracts, in reverse order of magnitude, a predetermined number of eigenvalues from among eigenvalues of $Q_k$ matrix (S630), and calculates eigenvectors corresponding to the extracted eigenvalues (S640). Here, the predetermined number may be equal to or less than $d_k/2$, and $d_k$ is a rank of the $Q_k$ matrix. In particular, each Tx node S(k) may extract, in order of magnitude, dk/2 eigenvalues. Next, the Tx node S(k) arranges the eigenvectors in a matrix to generate a precoder $V_k$ (S650). The Rx node may also perform the procedures S620 to S650 to identify the precoder $V_k$.

Next, the Tx node S(k) transmits a data stream multiplied by the precoder $V_k$ (S660). The Rx node received the signal from the Tx node S(k) decodes the signal based on the measured channel information and the precoder $V_k$. When the Rx node does not perform the procedures S620 to S650, the Tx node S(k) may feedback information on the determined precoder $V_k$ to the Rx node.

As such, according to an embodiment of the present invention, a precoder for decreasing an influence of the interference signal can be determined. Further, an amount of the feedback and the number of times of the feedback can be reduced. Accordingly, the precoding method according to an embodiment of the present invention can be easily applied to a network environment having a time-variant channel, and increase a data rate.

Figure 7:
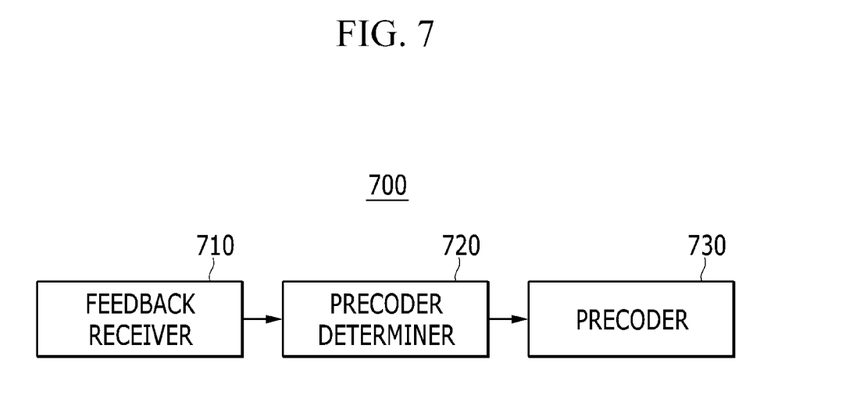
FIG. 7 is a block diagram of a precoding apparatus according to an embodiment of the present invention.

FIG. 7 is a block diagram of a precoding apparatus according to an embodiment of the present invention.

Referring to FIG. 7, a precoding apparatus 700 includes a feedback receiver 710, a precoder determiner 720, and a precoder 730. The precoding apparatus 700 may be included in a Tx or Rx node, or may be the Tx or Rx node.

The feedback receiver 710 receives a transformed correlation matrix $E[H_{ik}^* W_i^{-1} H_{ik}]$ of a channel coefficient matrix, a correlation matrix $E[H_{ik}^* H_{ik}]$ of the channel coefficient matrix, or a correlation matrix $E[H_{ik}^* H_{ik}]$ of an interference channel coefficient matrix from an Rx node.

If receiving the transformed correlation matrix $E[H_{ik}^* W_i^{-1} H_{ik}]$, the precoder determiner 720 extracts $d_k/2$ eigenvalues from among the transformed correlation matrix set $\{E[H_{ik}^* W_i^{-1} H_{ik}]\}$, and arranges eigenvectors corresponding to the extracted eigenvalues to generate a precoder. The precoder determiner 720 may determine the precoder using the transformed correlation matrix and a codebook.

If receiving the correlation matrix $E[H_{ik}^* H_{ik}]$ of the channel coefficient matrix, the precoder determiner 720 extracts $d_k/2$ eigenvalues from among the correlation matrix set $\{E[H_{ik}^* H_{ik}]\}$, and arranges eigenvectors corresponding to the extracted eigenvalues to generate the precoder. The precoder determiner 720 may determine the precoder using the correlation matrix and a codebook.

If receiving the correlation matrix $E[H_{ik}^* H_{ik}]$ of the interference channel coefficient matrix, the precoder determiner 720 calculates a signal strength from different nodes using the correlation matrix and a precoder set of a precoder codebook as expressed in Equation 1, selects a precoder set for minimizing the signal strength, and selects a precoder corresponding to its own index from the selected precoder set.

The precoder 730 precodes a signal to be transmitted using the determined precoder.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of precoding a signal by a transmit node, the method comprising:
   receiving channel information from each of a plurality of receive nodes sharing a radio resource, the channel information being a transformed correlation matrix or a correlation matrix calculated from at least a channel coefficient matrix;
   determining a precoder based on values determined by a channel information set that is a value set calculated from the transformed correlation matrix or from the correlation matrix; and
   precoding a transmit signal by using the precoder.

2. The method of claim 1, wherein the channel information includes a correlation matrix averaging a product of a conjugate transpose of the channel coefficient matrix and the channel coefficient matrix within a predetermined time domain and a predetermined frequency domain.

3. The method of claim 1, wherein the channel information is determined by the channel coefficient matrix and a noise signal.

4. The method of claim 3, wherein the channel information includes a transformed correlation matrix averaging a product of a conjugate transpose of the channel coefficient matrix, an inverse matrix of a covariance matrix of the noise signal, and the channel coefficient matrix within a predetermined time domain and a predetermined frequency domain.

5. The method of claim 1, wherein receiving the channel information includes receiving a bit stream that is calculated by quantizing the channel information.

6. The method of claim 1, wherein determining the precoder includes:
   extracting, in order of magnitude, a predetermined number of eigenvalues from among eigenvalues of the channel information set;
   calculating eigenvectors corresponding to the extracted eigenvalues; and
   arranging the eigenvectors in a matrix to generate the precoder.

7. The method of claim 6, wherein the predetermined number is equal to or less than half of a rank of the channel information set.

8. The method of claim 1, wherein determining the precoder includes:
   calculating a set of a matrix product of the channel information set and each code of a codebook of the transmit node;
   selecting a predetermined number of codes for maximizing a magnitude of the matrix product from among the set of the matrix product; and
   generating the precoder by using the selected codes.

9. The method of claim 8, wherein a product of a rank of the code of the codebook and the predetermined number is equal to or less than half of a rank of the channel information set.

10. A method of precoding a signal by a transmit node, the method comprising:
   receiving interference channel information from each of a plurality of receive nodes sharing a radio resource, the interference channel information being a correlation matrix calculated from at least an interference channel coefficient matrix;
   determining a precoder based on values determined by an interference channel information set that is a value set calculated from the correlation matrix; and
   precoding a transmit signal by using the precoder.

11. The method of claim 10, wherein the interference channel information includes a correlation matrix averaging a product of a conjugate transpose of the interference channel coefficient matrix and the interference channel coefficient matrix within a predetermined time domain and a predetermined frequency domain.

12. The method of claim 10, wherein receiving the interference channel information includes receiving a bit stream that is calculated by quantizing the interference channel information.

13. The method of claim 10, wherein determining the precoder includes:
   extracting, in reverse order of magnitude, a predetermined number of eigenvalues from among eigenvalues of an interference channel strength matrix calculated by adding the interference channel information;
   calculating eigenvectors corresponding to the extracted eigenvalues; and
   arranging the eigenvectors in a matrix to generate the precoder.

14. The method of claim 13, wherein the predetermined number is equal to or less than half of a rank of the interference channel strength matrix.

15. The method of claim 10, wherein determining the precoder includes:
   calculating an interference signal strength using the interference channel information and a codebook of the transmit node;
   selecting a precoder set for minimizing a sum of interference signal strengths for the plurality of receive nodes; and
   selecting the precoder corresponding to the transmit node from among the selected precoder set.

16. The method of claim 15, wherein the interference signal strength is a trace of a matrix corresponding to a product of the interference channel information, a precoder included in the codebook, and a conjugate transpose of the precoder included in the codebook.

17. A precoding apparatus comprising:
   a feedback receiver configured to receive a transformed correlation matrix of a channel coefficient matrix, a correlation matrix of the channel coefficient matrix, or a correlation matrix of an interference channel coefficient matrix from each of a plurality of receive nodes sharing a radio resource;
   a precoder determiner configured to determine a precoder based on a value maximizing values determined by a set of the transformed correlation matrix of the channel coefficient matrix or a set of the correlation matrix of the channel coefficient matrix, or a value minimizing values determined by a set of the correlation matrix of the interference channel coefficient matrix; and
   a precoder configured to precode a transmit signal using the determined precoder.

18. The precoding apparatus of claim 17, wherein the correlation matrix of the channel coefficient matrix is a matrix averaging a product of a conjugate transpose of the channel coefficient matrix and the channel coefficient matrix within a predetermined time domain and a predetermined frequency domain.

19. The precoding apparatus of claim 17, wherein the transformed correlation matrix of the channel coefficient matrix is a matrix averaging a product of a conjugate transpose of the channel coefficient matrix, an inverse matrix of a covariance matrix of a noise signal, and the channel coefficient matrix within a predetermined time domain and a predetermined frequency domain.

20. The precoding apparatus of claim 17, wherein the correlation matrix of the interference channel coefficient matrix is a matrix averaging a product of a conjugate transpose of the interference channel coefficient matrix and the interference channel coefficient matrix within a predetermined time domain and a predetermined frequency domain.

* * * * *